(12) United States Patent
Jeong et al.

(10) Patent No.: US 11,581,592 B2
(45) Date of Patent: Feb. 14, 2023

(54) BATTERY CASE HAVING GAS ADSORPTION LAYER

(71) Applicant: LG Chem, Ltd., Seoul (KR)

(72) Inventors: Hee Seok Jeong, Daejeon (KR); Eun Ju Lee, Daejeon (KR); Hyun Min Kim, Daejeon (KR); Jong Hwan Choi, Daejeon (KR)

(73) Assignee: LG Energy Solution, Ltd.

( * ) Notice: Subject to any disclaimer, the term of this patent is extended or adjusted under 35 U.S.C. 154(b) by 25 days.

(21) Appl. No.: 16/622,080

(22) PCT Filed: Dec. 19, 2018

(86) PCT No.: PCT/KR2018/016232
§ 371 (c)(1),
(2) Date: Dec. 12, 2019

(87) PCT Pub. No.: WO2019/139272
PCT Pub. Date: Jul. 18, 2019

(65) Prior Publication Data
US 2020/0185794 A1 Jun. 11, 2020

(30) Foreign Application Priority Data

Jan. 9, 2018 (KR) .................. 10-2018-0002945

(51) Int. Cl.
*H01M 10/52* (2006.01)
*H01M 50/10* (2021.01)
(Continued)

(52) U.S. Cl.
CPC .......... *H01M 10/52* (2013.01); *H01M 50/10* (2021.01); *H01M 50/116* (2021.01); *H01M 50/124* (2021.01); *H01M 2220/20* (2013.01)

(58) Field of Classification Search
CPC .............. H01M 50/10; H01M 50/116; H01M 50/124; H01M 50/1243; H01M 50/24;
(Continued)

(56) References Cited

U.S. PATENT DOCUMENTS 4,751,155 A  6/1988  Binder et al.
7,776,465 B1  8/2010  Hatazawa et al.
(Continued)

FOREIGN PATENT DOCUMENTS

CN  1031912 A  3/1989
CN  102934278 A  2/2013
(Continued)

OTHER PUBLICATIONS

Lee, Kyoung Hee, et al. "Mechanism of gas build-up in a Li-ion cell at elevated temperature." Journal of power sources 132.1-2 (2004): 201-205. (Year: 2004).*

(Continued)

*Primary Examiner* — Maria Laios
*Assistant Examiner* — Grace Ann Kenlaw
(74) *Attorney, Agent, or Firm* — Lerner, David, Littenberg, Krumholz & Mentlik, LLP

(57) ABSTRACT

Disclosed herein is a battery case configured to receive an electrode assembly and an electrolytic solution therein, the electrode assembly including a positive electrode, a negative electrode, and a separator interposed between the positive electrode and the negative electrode, the battery case including a layer structure and a gas adsorption layer formed on the inner surface of the layer structure, the gas adsorption layer including a gas adsorption material layer configured to adsorb a reaction gas that may be generated within the battery case during abnormal functioning of the electrode assembly, and a blocking layer formed on an exposed surface of the gas adsorption material layer, the blocking (Continued)

layer configured to prevent the gas adsorption material layer from being exposed to an ambient gas during assembly of the battery case.

7 Claims, 2 Drawing Sheets

(51) Int. Cl.
*H01M 50/116* (2021.01)
*H01M 50/124* (2021.01)

(58) Field of Classification Search
CPC ............. H01M 50/392; H01M 2/0287; H01M 2/0257; H01M 2/1258; H01M 10/52
See application file for complete search history.

(56) References Cited

U.S. PATENT DOCUMENTS

| | | | |
|---|---|---|---|
| 8,748,022 | B2 | 6/2014 | Song et al. |
| 2007/0054184 | A1 | 3/2007 | Yong et al. |
| 2012/0070703 | A1 | 3/2012 | Wahl et al. |
| 2013/0171483 | A1 | 7/2013 | Shibata et al. |
| 2013/0202932 | A1 | 8/2013 | Song et al. |
| 2018/0175455 | A1* | 6/2018 | Bao ................... H01M 10/0525 |
| 2018/0248235 | A1 | 8/2018 | Kim et al. |
| 2019/0252737 | A1 | 8/2019 | Oh et al. |

FOREIGN PATENT DOCUMENTS

| | | | |
|---|---|---|---|
| CN | 209515747 U | | 10/2019 |
| EP | 2394330 B1 | | 4/2014 |
| JP | H11191400 A | | 7/1999 |
| JP | 2001155790 A | | 6/2001 |
| JP | 2007510266 A | | 4/2007 |
| JP | 2012059489 A | | 3/2012 |
| JP | 5820531 B2 | | 11/2015 |
| JP | 2018530878 A | | 10/2018 |
| KR | 20010052006 A | | 6/2001 |
| KR | 20130090190 A | | 8/2013 |
| KR | 20150096124 A | * | 8/2015 |
| KR | 20160037473 A | | 4/2016 |
| KR | 20160037473 A | * | 4/2016 |
| KR | 20170064796 A | | 6/2017 |
| KR | 20170082328 A | | 7/2017 |
| WO | 2014027388 A1 | | 2/2014 |
| WO | 2017099333 A1 | | 6/2017 |
| WO | 2017119750 A1 | | 7/2017 |

OTHER PUBLICATIONS

Chinese Search Report for Application 201811610960.4 dated Mar. 17, 2020, 2 pages.
Extended European Search Report with Written Opinion for Application No. 18899250.7 dated May 19, 2020, 8 pages.
Indian Examination Report for Application No. 201917046914 dated Jul. 27, 2021, 1 Page.

* cited by examiner

【FIG. 1】
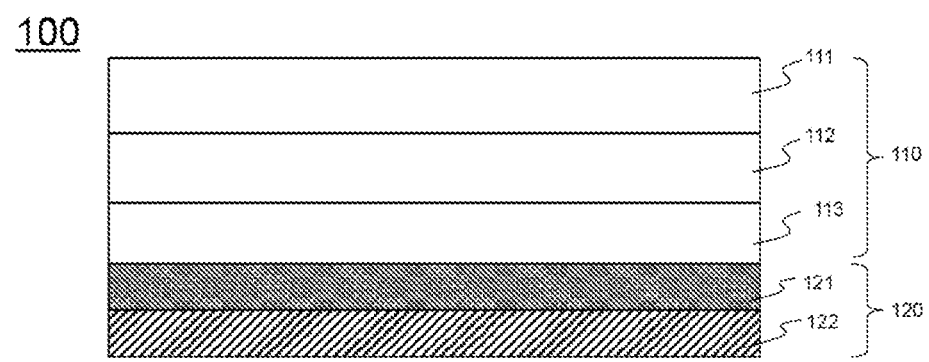
【FIG. 2】
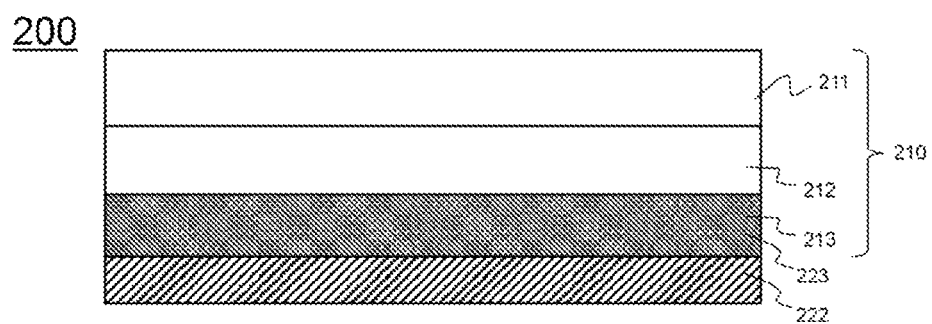

【FIG. 3】
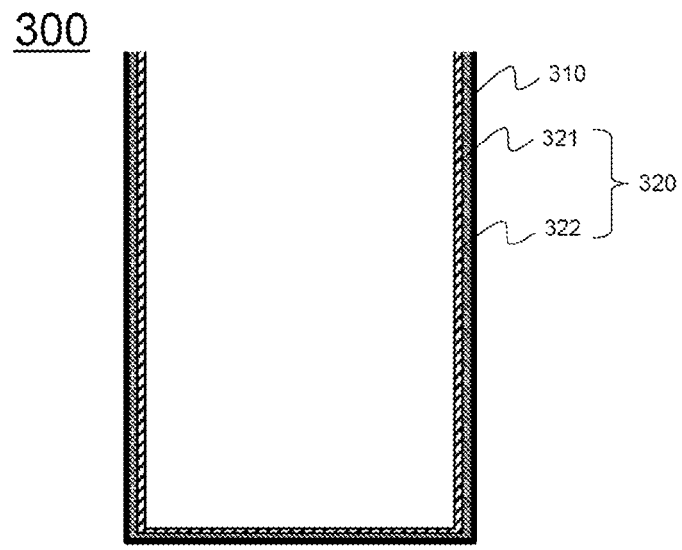
【FIG. 4】
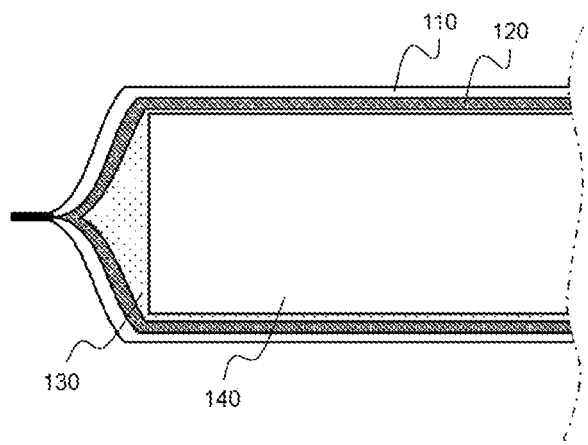

BATTERY CASE HAVING GAS ADSORPTION LAYER

CROSS-REFERENCE TO RELATED APPLICATIONS

The present application is a national phase entry under 35 U.S.C. § 371 of International Patent Application No. PCT/KR2018/016232, filed on Dec. 19, 2018, published in Korean, which claims priority from Korean Patent Application No. 10-2018-0002945, filed on Jan. 9, 2018, the disclosures of which are hereby incorporated herein by reference.

TECHNICAL FIELD

The present invention relates to a battery case including a gas adsorption layer and a battery including the same, and more particularly to a battery case including a gas adsorption layer formed on the inner surface thereof, which is opposite an electrode assembly, wherein the gas adsorption layer includes a gas adsorption material layer for adsorbing gas that is generated in a battery and a blocking layer formed on the outer surface of the gas adsorption material layer for preventing the gas adsorption material layer from being exposed to the outside until predetermined conditions are satisfied.

BACKGROUND ART

Secondary batteries, which can be repeatedly charged and discharged, have attracted considerable attention as power sources for transportation means requiring high output and large capacity, including an electric vehicle (EV), a hybrid electric vehicle (HEV), and a plug-in hybrid electric vehicle (Plug-In HEV), which have been proposed as alternatives to existing gasoline and diesel vehicles.

Secondary batteries may be classified into a cylindrical battery, a prismatic battery, and a pouch-shaped battery based on the shape thereof. Among these batteries, the pouch-shaped battery, which can be stacked with high integration, has high energy density per unit weight, is inexpensive, and can be easily modified, has attracted considerable attention. Particularly, in recent years, there has been a lot of interest in a pouch-shaped battery that uses an aluminum laminate sheet as a sheathing member because of the light weight, low manufacturing costs, easy modification of the shape thereof, etc.

However, when the pouch-shaped battery is in an abnormal state, such as a short circuit in the battery, overcharge of the battery with higher than an allowed current or voltage, or exposure of the battery to high temperatures, after the battery is finally sealed, an electrolytic solution is dissolved in the battery, whereby high-pressure gas may be generated in the battery. The generated high-pressure gas may deform a pouch-shaped battery case of the battery, may reduce the lifespan of the battery, and may even cause the battery to catch fire or explode.

For example, the overheated battery may generate gas, and the pressurized gas in the pouch-shaped battery case may further accelerate decomposition of the components constituting the battery, which may causes continuous overheating of the battery and the generation of gas in the battery. If the temperature of the battery reaches the critical temperature thereof, the battery may catch fire or explode. Furthermore, in the case in which a plurality of unit batteries is aggregated densely in a limited space, as in a battery module, a major accident may occur.

Conventionally, a positive temperature coefficient (PTC) element, a fuse, or a decompression protection circuit is used in order to improve the safety of the battery, or an additive for improving the safety of the battery is added to an electrolytic solution or an electrode. Even in the case in which such means are provided, however, gas is generated in the battery due to an abnormal reaction in the battery when the battery is in an abnormal state, or the performance of the battery is reduced due to the addition of such a material.

In recent years, the demand for higher energy density has increased, whereby portions that function as conventional gas pockets have been gradually removed from the battery. For this reason, there is a necessity for a new method that is capable of efficiently removing gas that is generated in the limited space defined in the battery in order to prevent the battery from catching fire or exploding without reducing the overall performance of the battery.

Patent Document 1 discloses a laminate sheet including a gas adsorptive polymer layer having a gas adsorptive polymer contained therein. However, no construction for protecting the gas adsorptive polymer layer is provided. As a result, gas in the air may be adsorbed to the gas adsorptive polymer layer during assembly of a battery, whereby the effect of trying to adsorb gas that is generated only in the battery is rapidly reduced.

Patent Document 2 discloses a secondary battery configured to have a structure in which a gas adsorption layer is interposed between a metal layer and a sealant layer of a laminate sheet, wherein, when the sealant layer is removed due to external impacts that are applied to the battery or due to heat or pressure that is generated in the battery, the gas adsorption layer is exposed in order to adsorb gas that is generated in the battery. However, the adsorption of gas in the secondary battery is performed only when the battery is in a very abnormal state, and therefore it is not possible to effectively control the battery that is already overheated.

Patent Document 3 discloses a laminate sheet including a gas adsorptive polymer layer for adsorbing gas that is generated in a battery. However, no construction for protecting the gas adsorptive polymer layer is provided. As a result, gas in the air is adsorbed to the gas adsorptive polymer layer while the battery is assembled, whereby the effect of adsorbing gas that is generated in the battery may be reduced.

RELATED ART DOCUMENT (Patent Document 1) Korean Patent Application Publication No. 2017-0082328

(Patent Document 2) Korean Patent Application Publication No. 2016-0037473

(Patent Document 3) Korean Patent Application Publication No. 2017-0064796

DISCLOSURE

Technical Problem

The present invention has been made in view of the above problems and other technical problems that have yet to be resolved, and it is an object of the present invention to provide a battery case including a gas adsorption layer, which includes a gas adsorption material layer and a blocking layer, formed on the inner surface of the battery case so as to be exposed to external air while a battery is assembled in order to effectively adsorb only gas that is generated in the battery.

Technical Solution

In accordance with an aspect of the present invention, the above and other objects can be accomplished by the provision of a battery case configured to receive an electrode assembly and an electrolytic solution therein, the electrode assembly including a positive electrode, a negative electrode, and a separator interposed between the positive electrode and the negative electrode, the battery case including a layer structure and a gas adsorption layer formed on an inner surface of the layer structure, the gas adsorption layer including a gas adsorption material layer configured to adsorb a reaction gas that may be generated within the battery case during abnormal functioning of the electrode assembly, and a blocking layer formed on an exposed surface of the gas adsorption material layer, the blocking layer configured to prevent the gas adsorption material layer from being exposed to an ambient gas during assembly of the battery case.

After assembly of the battery case, the electrolytic solution may contact the gas adsorption layer.

The blocking layer may be made of a material that is configured to be dissolved or dispersed by the electrolytic solution. The blocking layer may be configured to be dissolved or dispersed by the electrolytic solution after assembly of the battery case, such that the gas adsorption material layer is exposed to the electrolytic solution.

The material for the blocking layer is not particularly restricted, as long as the blocking layer is made of a material that does not transmit gas and that can be dissolved or dispersed by the electrolytic solution. Specifically, the blocking layer may be made of polymer film.

In a concrete example, the blocking layer may be made of film, at least a portion of which melts as the result of contacting the electrolytic solution. The film may be film that does not transmit air and at least a portion of which melts as the result of a carbonate-based solvent in the electrolytic solution permeating into spaces defined between molecules of the film when the film contacts the electrolytic solution. In addition, the film may be a polymer film selected from among polystyrene (PS), polyamide, polyacrylonitrile, polyvinyl alcohol, polycarbonate, polyethylene vinyl acetate, and OPS.

In addition, the blocking layer may be made of a solid-type or gel-type electrolyte. In this case, the electrolytic solution that is consumed when gas is generated in the battery may be replenished, whereby it is possible to increase the lifespan of the battery.

The gas adsorption material layer may include at least one gas adsorption material selected from the group consisting of organic or inorganic compounds or metals that exhibit high gas adsorptivity.

The kind of the gas adsorption material is not particularly restricted, as long as the gas adsorption material is capable of easily adsorbing gas that is generated in the battery at a high rate, thereby exhibiting desired effects. Specifically, the gas adsorption material may be at least one selected from the group consisting of a molecular sieve and a metal component that exhibit high gas adsorptivity.

The molecular sieve exhibiting high gas absorptivity may be at least one selected from the group consisting of silica gel, carbon fiber, a porous carbon material, porous metal oxide, and porous gel.

Here, the porous carbon material may be at least one selected from the group consisting of a carbon molecular sieve and active carbon, and the porous metal oxide may be at least one selected from the group consisting of zeolite, silica gel, and alumina.

In addition, the metal component may be at least one selected from the group consisting of nickel (Ni), platinum (Pt), palladium (Pd), calcium (Ca), strontium (Sr), barium (Ba), thallium (Tl), zirconium (Zr), hafnium (Hf), vanadium (V), niobium (Nb), tantalum (Ta), chrome (Cr), molybdenum (Mo), and tungsten (W).

In addition, sodium hydroxide (NaOH), calcium hydroxide ($Ca(OH)_2$), or potassium hydroxide (KOH) may be used.

In addition, a specific gas adsorption material that is capable of adsorbing a large amount of gas that is generated may be included in order to selectively remove gas in consideration of the kind of an electrode active material and an electrolytic solution that is used.

The layer structure may include an outer coating layer and a metal layer disposed adjacent to the outer coating layer, the battery case further including an inner resin layer disposed adjacent to the metal layer, the layer structure and the inner resin layer together forming a laminate pouch. The layer structure may include a can-shaped metal.

The outer coating layer defines the outer surface of the pouch-shaped battery case. Consequently, it is necessary for the outer coating layer to exhibit high tensile strength and high weather resistance in order to stably protect the electrode assembly from the external environment. An outer coating layer made of polyethylene terephthalate (PET) or oriented nylon (ONy) may satisfy the above-mentioned requirements. The can-shaped battery case does not require strength equivalent to the strength of the laminate sheet.

The metal layer is a layer for blocking gas containing air, moisture, etc. The metal layer may be made of a material that exhibits high formability and predetermined strength and that is capable of blocking moisture or air. The metal layer may be made of aluminum, an aluminum alloy, copper, stainless steel, or an iron alloy.

In a concrete example, the inner resin layer may have a gas adsorption material included therein.

In the case in which the gas adsorption material is included in the inner resin layer, it is possible to reduce the thickness of the battery. In addition, it is possible to reduce the size of a useless space in the battery, whereby it is possible to increase the energy density of the battery.

The gas adsorption material may be included such that the gas adsorption material accounts for 40 weight % to 90 weight % based on the total weight of the inner resin layer. Specifically, the gas adsorption material may be included such that the gas adsorption material accounts for 50 weight % to 90 weight % based on the total weight of the inner resin layer. More specifically, the gas adsorption material may be included such that the gas adsorption material accounts for 50 weight % to 80 weight % based on the total weight of the inner resin layer.

In the case in which the gas adsorption material is included such that the gas adsorption material accounts for less than 40 weight % based on the total weight of the inner resin layer, the amount of gas that is adsorbed while the battery is normally used is reduced, whereby a swelling phenomenon may occur within a short time, which is undesirable. In the case in which the gas adsorption material is included such that the gas adsorption material accounts for greater than 90 weight % based on the total weight of the inner resin layer, the sealing force of the inner resin layer is reduced, which is also undesirable.

In addition, the gas adsorption material may be formed as a separate layer instead of being included in the inner resin layer of the laminate sheet. In this case, however, it is necessary to provide the layer including the gas adsorption material with a separate material that is capable of providing adhesive force.

In accordance with another aspect of the present invention, there is provided a battery cell including the battery case.

The battery may be a primary battery or a secondary battery.

Based on the shape of a battery case, the secondary battery may be a cylindrical battery having an electrode assembly mounted in a cylindrical metal can, a prismatic battery having an electrode assembly mounted in a prismatic metal can, or a pouch-shaped battery having an electrode assembly mounted in a pouch-shaped case made of an aluminum laminate sheet.

The secondary battery may be a lithium secondary battery configured to have a structure in which an electrode assembly, in which a separator is interposed between a positive electrode and a negative electrode, is impregnated with a non-aqueous electrolytic solution containing lithium salt.

The positive electrode is manufactured, for example, by applying a positive electrode mixture including a positive electrode active material to a positive electrode current collector and drying the positive electrode mixture. The positive electrode mixture may further selectively include a binder, a conductive agent, and a filler as needed.

In general, the positive electrode current collector is manufactured so as to have a thickness of 3 µm to 500 µm. The positive electrode current collector is not particularly restricted, as long as the positive electrode current collector exhibits high conductivity while the positive electrode current collector does not induce any chemical change in a battery to which the positive electrode current collector is applied. For example, the positive electrode current collector may be made of stainless steel, aluminum, nickel, titanium, or plastic carbon. Alternatively, the positive electrode current collector may be made of aluminum or stainless steel, the surface of which is treated with carbon, nickel, titanium, or silver. In addition, the positive electrode current collector may have a micro-scale uneven pattern formed on the surface thereof so as to increase the force of adhesion of the positive electrode active material. The positive electrode current collector may be configured in various forms, such as those of a film, a sheet, a foil, a net, a porous body, a foam body, and a non-woven fabric body.

The positive electrode active material is a material that is capable of inducing an electrochemical reaction. The positive electrode active material may be a lithium transition metal oxide including two or more transition metals. For example, the positive electrode active material may be, but is not limited to, a layered compound, such as a lithium cobalt oxide ($LiCoO_2$) or a lithium nickel oxide ($LiNiO_2$) substituted with one or more transition metals; a lithium manganese oxide substituted with one or more transition metals; a lithium nickel-based oxide represented by the chemical formula $LiNi_{1-y}M_yO_2$ (where M=Co, Mn, Al, Cu, Fe, Mg, B, Cr, Zn, or Ga, at least one of which is included, and $0.01 \leq y \leq 0.7$); a lithium nickel cobalt manganese composite oxide represented by the chemical formula $Li_{1+z}Ni_bMn_cCo_{1-(b+c+d)}M_dO_{(2-e)}A_e$ (where $-0.5 \leq z \leq 0.5$, $0.1 \leq b \leq 0.8$, $0.1 \leq c \leq 0.8$, $0 \leq d \leq 0.2$, $0 \leq e \leq 0.2$, $b+c+d \leq 1$, M=Al, Mg, Cr, Ti, Si, or Y, and A=F, P, or Cl), such as $Li_{1+z}Ni_{1/3}Co_{1/3}Mn_{1/3}O_2$ or $Li_{1+z}Ni_{0.4}Mn_{0.4}Co_{0.2}O_2$; or olivine-based lithium metal phosphate represented by the chemical formula $Li_{1+x}M_{1-y}M'_yPO_{4-z}X_z$ (where M=a transition metal, preferably Fe, Mn, Co, or Ni, M'=Al, Mg, or Ti, X=F, S, or N, $-0.5 \leq x \leq 0.5$, $0 \leq y \leq 0.5$, and $00.1$).

The conductive agent is generally added such that the conductive agent accounts for 1 weight % to 30 weight % based on the total weight of the compound including the positive electrode active material. The conductive agent is not particularly restricted, as long as the conductive agent exhibits high conductivity without inducing any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as a zinc oxide or potassium titanate; a conductive metal oxide, such as a titanium oxide; or conductive materials, such as polyphenylene derivatives, may be used as the conductive agent.

The binder is a component assisting in binding between the active material and the conductive agent and in binding with the current collector. The binder is generally added in an amount of 1 weight % to 30 weight % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene monomer (EPDM), sulfonated EPDM, styrene butadiene rubber (SBR), fluoro rubber, and various copolymers.

The filler is an optional component used to inhibit expansion of the electrode. There is no particular limit to the filler, as long as the filler is made of a fibrous material while the filler does not cause chemical changes in a battery to which the filler is applied. As examples of the filler, there may be used olefin-based polymers, such as polyethylene and polypropylene; and fibrous materials, such as glass fiber and carbon fiber.

The negative electrode may be manufactured, for example, by applying a negative electrode mixture including a negative electrode active material to a negative electrode current collector and drying the negative electrode mixture. The negative electrode mixture may include the above-described components, such as a conductive agent, a binder, and a filler, as needed.

In general, the negative electrode current collector is manufactured so as to have a thickness of 3 µm to 500 µm. The negative electrode current collector is not particularly restricted, as long as the negative electrode current collector exhibits high conductivity while the negative electrode current collector does not induce any chemical change in a battery to which the negative electrode current collector is applied. For example, the negative electrode current collector may be made of copper, stainless steel, aluminum, nickel, titanium, or plastic carbon. Alternatively, the negative electrode current collector may be made of copper or stainless steel, the surface of which is treated with carbon, nickel, titanium, or silver, or an aluminum-cadmium alloy. In addition, the negative electrode current collector may have a micro-scale uneven pattern formed on the surface thereof so as to increase the force of adhesion of the negative electrode active material, in the same manner as the positive electrode current collector. The negative electrode current collector may be configured in various forms, such as those of a film, a sheet, a foil, a net, a porous body, a foam body, and a non-woven fabric body.

The negative electrode active material includes the above-described silicon-based compound. As the negative electrode active material, for example, there may be used carbon, such as a non-graphitizing carbon or a graphite-based carbon; a metal composite oxide, such as $Li_xFe_2O_3$ ($0 \le x \le 1$), $Li_xWO_2$ ($0 \le x \le 1$), or $Sn_xMe_{1-x}Me'_yO_z$ (Me: Mn, Fe, Pb, Ge; Me': Al, B, P, Si, Group 1, 2 and 3 elements of the periodic table, halogen; $0 < x \le 1$; $1 \le y \le 3$; $1 \le z \le 8$); a lithium metal; a lithium alloy; a silicon-based alloy; a tin-based alloy; a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; a conductive polymer, such as polyacetylene; or a Li—Co—Ni based material.

The binder, the conductive agent, and components of the filler may be applied to be identical to those described in connection with the positive electrode.

In addition, one component from other components, such as a viscosity-controlling agent and an adhesion promoter, may selectively be included, or a combination of two or more components may be further included.

The viscosity-controlling agent is a component for controlling the viscosity of the electrode mixture so as to facilitate mixing of the electrode mixture and coating thereof on the current collector. The viscosity-controlling agent may be added in an amount of up to 30 weight % based on the total weight of the negative electrode mixture. Examples of the viscosity-controlling agent include, without being limited to, carboxymethylcellulose and polyvinylidenefluoride. However, the present invention is not limited thereto. Depending on the circumstances, the above-described solvent may also function as the viscosity-controlling agent.

The adhesion promoter is an auxiliary component that is added to improve adhesion between the electrode active material and the electrode current collector. The adhesion promoter may be added in an amount of 10 weight % or less based on the amount of the binder. Examples of the adhesion promoter include, without being limited to, oxalic acid, adipic acid, formic acid, acrylic acid derivatives, and itaconic acid derivatives.

The non-aqueous electrolytic solution containing lithium salt is composed of an electrolytic solution and lithium salt. A non-aqueous organic solvent, an organic solid electrolyte, or an inorganic solid electrolyte may be used as the electrolytic solution.

As examples of the non-protic organic solvent, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulphates of lithium (Li), such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the above-mentioned non-aqueous electrolyte, and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethyleneglycoldialkyl ether, ammonium salts, pyrrole, 2-methoxy ethanol, aluminumtrichloride, or the like may be added to the non-aqueous electrolytic solution. Depending on the circumstances, in order to impart incombustibility thereto, the non-aqueous electrolytic solution may further include halogen-containing solvents, such as carbon tetrachloride and ethylene trifluoride. Furthermore, in order to improve high-temperature retention characteristics thereof, the non-aqueous electrolytic solution may further include carbon dioxide gas. Moreover, fluoro-ethylene carbonate (FEC) and propene sultone (PRS) may be further included.

In a preferred example, lithium salt, such as $LiPF_6$, $LiClO_4$, $LiBF_4$, or $LiN(SO_2CF_3)_2$, may be added to a mixed solvent of cyclic carbonate, such as EC or PC, which is a high-dielectric solvent, and linear carbonate, such as DEC, DMC, or EMC, which is a low-viscosity solvent, in order to manufacture a non-aqueous electrolyte containing lithium salt.

In accordance with a further aspect of the present invention, there is provided a battery pack including the battery.

Specifically, the battery pack may be used as a power source for a device requiring the ability to withstand high temperatures, a long cycle, high rate characteristics, etc. Specific examples of the device may include a mobile electronic device, a wearable electronic device, a power tool driven by a battery-powered motor, an electric automobile, such as an electric vehicle (EV), a hybrid electric vehicle (HEV), or a plug-in hybrid electric vehicle (PHEV), an electric two-wheeled vehicle, such as an electric bicycle (E-bike) or an electric scooter (E-scooter), an electric golf cart, and a power storage system. However, the present invention is not limited thereto.

The structure and manufacturing method of the device are well known in the art to which the present invention pertains, and a detailed description thereof will be omitted.

BRIEF DESCRIPTION OF DRAWINGS

FIG. 1 is a vertical sectional view showing a pouch-shaped battery case according to an embodiment of the present invention.

FIG. 2 is a vertical sectional view showing a pouch-shaped battery case according to another embodiment of the present invention.

FIG. 3 is a vertical sectional view showing a can-shaped battery case according to an embodiment of the present invention.

FIG. 4 is a partial vertical sectional view showing a pouch-shaped secondary battery configured to have a structure in which an electrode assembly is received in the battery case of FIG. 1 together with an electrolytic solution.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

Wherever possible, the same reference numbers will be used throughout the drawings to refer to parts that perform similar functions or operations. Meanwhile, in the case in which one part is 'connected' to another part in the following description of the present invention, not only may the one part be directly connected to the another part, but also, the one part may be indirectly connected to the another part via a further part. In addition, that a certain element is 'included' means that other elements are not excluded, but may be further included unless mentioned otherwise.

Reference will now be made in detail to the preferred embodiments of the present invention, examples of which are illustrated in the accompanying drawings.

FIG. 1 is a vertical sectional view showing a pouch-shaped battery case 100 according to an embodiment of the present invention.

The pouch-shaped battery case 100 of FIG. 1 is configured to have a structure in which a gas adsorption layer 120 is attached to an inner surface of a laminate sheet 110, which includes an outer coating layer 111, a metal layer 112, and an inner resin layer 113, which are sequentially stacked from the outside.

The gas adsorption layer 120 includes a gas adsorption material layer 121 for adsorbing gas generated in a battery and a blocking layer 122 formed on the outer surface of the gas adsorption material layer 121 for preventing the gas adsorption material layer 121 from being exposed to the outside.

FIG. 2 is a vertical sectional view showing a pouch-shaped battery case 200 according to another embodiment of the present invention.

Referring to FIG. 2, the pouch-shaped battery case 200 is configured to have a structure in which a blocking layer 222 is attached to an inner surface of a laminate sheet 210, which includes an outer coating layer 211, a metal layer 212, and an inner resin layer 213, which are sequentially stacked from the outside.

The pouch-shaped battery case 200 does not include a separate gas adsorption material layer. Instead, a gas adsorption material 223 is included in the inner resin layer 213.

FIG. 3 is a vertical sectional view showing a can-shaped battery case 300 according to an embodiment of the present invention.

Referring to FIG. 3, a gas adsorption layer 320, which includes a gas adsorption material layer 321 and a blocking layer 322, is formed in the can-shaped battery case 300.

Referring to FIGS. 1 and 4, particularly FIG. 4 is a partial vertical sectional view showing a pouch-shaped secondary battery configured to have a structure in which an electrode assembly 140 is received in the pouch-shaped battery case 100 together with an electrolytic solution 130.

The electrode assembly 140 is placed in the pouch-shaped battery case 100, the electrolytic solution 130 is injected into the pouch-shaped battery case 100, and a final sealing process is performed. As a result, the blocking layer is dissolved or dispersed by the electrolytic solution 130, whereby the gas adsorption material layer 121 is exposed to the inner surface of the pouch-shaped battery case 100.

The gas adsorption material layer 121 exposed to the inner surface of the pouch-shaped battery case adsorbs gas generated in the battery. Although only the gas adsorption layer 120 is shown in FIG. 4, the gas adsorption material layer 121 is dissolved or dispersed by the electrolytic solution.

In the above structure, gas that is inevitably generated when the battery is usually used, as well as gas that is generated when the battery is abnormally used, directly reacts with a gas adsorption material constituting the gas adsorption material layer, whereby the gases are more rapidly removed. As a result, a swelling phenomenon is reduced. Consequently, it is possible to maximally preventing the battery from exploding or catching fire, whereby it is possible to improve the safety of the battery. In particular, the pouch-shaped secondary battery according to the present invention is characterized in that the pouch-shaped secondary battery is configured to have a structure that is capable of preventing non-ideal adsorption of gas that may occur when the battery is assembled and that is capable of allowing the adsorption of gas only when the battery is actually used, which has not yet been disclosed or suggested in the conventional art. Consequently, the present invention provides strong effects through the very simple structure described above.

Those skilled in the art to which the present invention pertains will appreciate that various applications and modifications are possible based on the above description, without departing from the scope of the present invention.

DESCRIPTION OF REFERENCE NUMERALS 100, 200: Pouch-shaped battery cases
300: Can-shaped battery case
110, 210: Laminate sheets
111, 211: Outer coating layers
112, 212: Metal layers
113, 213: Inner resin layers
120, 320: Gas adsorption layers
121, 321: Gas adsorption material layers
122, 222, 322: Blocking layers
223: Gas adsorption material
130: Electrolytic solution
140: Electrode assembly

INDUSTRIAL APPLICABILITY

As is apparent from the above description, a battery case according to the present invention is configured to have a structure in which a blocking layer is formed on the outer surface of a gas adsorption material layer. As a result, gas in the air is not adsorbed when a battery is assembled. After the battery is finally sealed, the blocking layer is dissolved by an electrolytic solution, whereby only the gas that is generated in the battery is effectively adsorbed. Consequently, it is possible to prevent the thickness or the inner pressure of the battery from being increased due to the gas generated in the battery, whereby it is possible to greatly improve the safety of the battery.

In addition, the size of a useless space in the battery is reduced, whereby it is possible to improve the energy density of the battery.

In addition, the electrolytic solution that is consumed when the battery is charged and discharged is replenished, since the blocking layer may be made of a solid-type or gel-type electrolyte, whereby it is possible to increase the lifespan of the battery.

The invention claimed is:

1. A battery case configured to receive an electrode assembly and an electrolytic solution therein, the electrode assembly comprising a positive electrode, a negative electrode, and a separator interposed between the positive electrode and the negative electrode, the battery case comprising:
    a layer structure; and
    a gas adsorption layer formed on an inner surface of the layer structure, the gas adsorption layer comprising:
    a gas adsorption material layer configured to adsorb a reaction gas that may be generated within the battery case during abnormal functioning of the electrode assembly; and
    a blocking layer formed on an exposed surface of the gas adsorption material layer, the blocking layer configured to prevent the gas adsorption material layer from being exposed to an ambient gas during assembly of the battery case, the blocking layer being a film having a structure that does not transmit air to the gas adsorption material layer, the blocking layer covering all of the gas adsorption material layer during assembly of the battery case,
    wherein the blocking layer is configured to be dissolved by the electrolytic solution after assembly of the battery case, such that the gas adsorption material layer is exposed to the electrolytic solution,
    wherein the blocking layer consists of a polymer film selected from among polyamide, polyvinyl alcohol, polycarbonate and polyethylene vinyl acetate.

2. The battery case according to claim 1, wherein, after assembly of the battery case, the electrolytic solution contacts the gas adsorption layer.

3. The battery case according to claim 1, wherein the gas adsorption material layer comprises at least one gas adsorption material selected from a group consisting of organic compounds or metals.

4. The battery case according to claim 1, wherein the layer structure comprises an outer coating layer and a metal layer disposed adjacent to the outer coating layer, the battery case further comprising an inner resin layer disposed adjacent to the metal layer, the layer structure and the inner resin layer together forming a laminate pouch.

5. The battery case according to claim 4, wherein the inner resin layer has the gas adsorption material contained therein.

6. A battery cell comprising a battery case according to claim 1.

7. The battery case according to claim 1, wherein the layer structure comprises a can-shaped metal.

* * * * *